United States Patent [19]

Nozawa et al.

[11] 4,180,315
[45] Dec. 25, 1979

[54] AUTOMATIC FILM WINDING APPARATUS FOR USE WITH CAMERAS

[75] Inventors: Shiyozo Nozawa; Saburo Hokari, both of Kawasaki; Shigeru Yamaga, Tokyo, all of Japan

[73] Assignee: Ricoh Company, Ltd., Japan

[21] Appl. No.: 919,628

[22] Filed: Jun. 27, 1978

[30] Foreign Application Priority Data

Jun. 28, 1977 [JP] Japan .................................. 52-77009

[51] Int. Cl.$^2$ .............................................. G03B 1/18
[52] U.S. Cl. ..................................... 354/170; 354/173
[58] Field of Search ............... 354/170, 171, 173, 212; 352/168

[56] References Cited

U.S. PATENT DOCUMENTS

| | | | |
|---|---|---|---|
| 1,911,845 | 5/1933 | Owens | 352/168 X |
| 2,759,561 | 8/1956 | Bosley | 352/168 X |
| 2,769,380 | 11/1956 | Rapaport | 354/171 |
| 3,084,606 | 4/1963 | Goldberg | 354/173 |

*Primary Examiner*—Donald A. Griffin
*Assistant Examiner*—Thomas H. Tarcza
*Attorney, Agent, or Firm*—McGlew and Tuttle

[57] ABSTRACT

An automatic film winding apparatus for use with cameras comprises a sub-driving apparatus comprising a spring motor in addition to a main driving apparatus comprising an electric motor for film winding. When the main driving apparatus does not work, the sub-driving apparatus can be selectively worked for film winding in place of the main driving apparatus.

8 Claims, 2 Drawing Figures

AUTOMATIC FILM WINDING APPARATUS FOR USE WITH CAMERAS

BACKGROUND OF THE INVENTION

The present invention relates to an automatic film winding apparatus for use with cameras, and more particularly to an improved automatic film winding apparatus in which a sub-driving apparatus comprising a spring motor is provided in addition to a main diriving apparatus for film winding.

Conventionally, an electric motor, a spring motor and a gas pressure of a high pressure gas cylinder are used as a driving force source of the film winding apparatus for use with cameras.

However, the automatic film winding apparatus employing such a single driving force source as mentioned above has certain shortcomings. For example, an automatic film winding apparatus employing an electric motor requires at least a certain minimum power level, and increasing the size of the battery to increase the life of the battery for use with the film winding apparatus will cause an increase of the size of the apparatus or the weight thereof and the apparatus will become inconvenient for carrying by hand.

In the case of a film winding apparatus employing a spring motor, the driving force storage capacity of the spring motor is comparatively small so that rewinding the spring to provide the driving force is necessary after several frames of a film. Therefore, the spring motor is not suitable for a continuous photographing, and in order to increase the driving force storage capacity, the size and the weight of the film winding apparatus have to be increased, which makes the apparatus inconvenient for carrying by hand.

Furthermore, in the case of a film winding apparatus employing a high pressure gas cylinder, a mechanism for preventing leakage of gas and that for preventing destruction of the apparatus have to be provided in the apparatus, which makes the apparatus complicated in mechanism and requires a high accuracy of the size of of each part of the apparatus in order to maintain the gastightness of the apparatus. Accordingly, the production cost of the apparatus becomes high. Moreover, the high pressure gas cylinder is not easily available.

SUMMARY OF THE INVENTION

It is therefore an object of the present invention to provide an improved automatic film winding apparatus which does not have the above-mentioned shortcomings as found in the conventional film winding apparatus, in other words, to provide an automatic film winding apparatus which is light and small in size and capable of a sure continuous photographing.

In order to attain this object, in the present invention, a sub-driving apparatus comprising a spring motor is provided in addition to a main driving apparatus comprising an electric motor for film winding so that, when the voltage of a power source for the motor becomes too low, film winding can be done by the sub-driving apparatus in place of the main driving apparatus.

DETAILED DESCRIPTION OF THE PREFERRED EMBODIMENT

Figure 1:
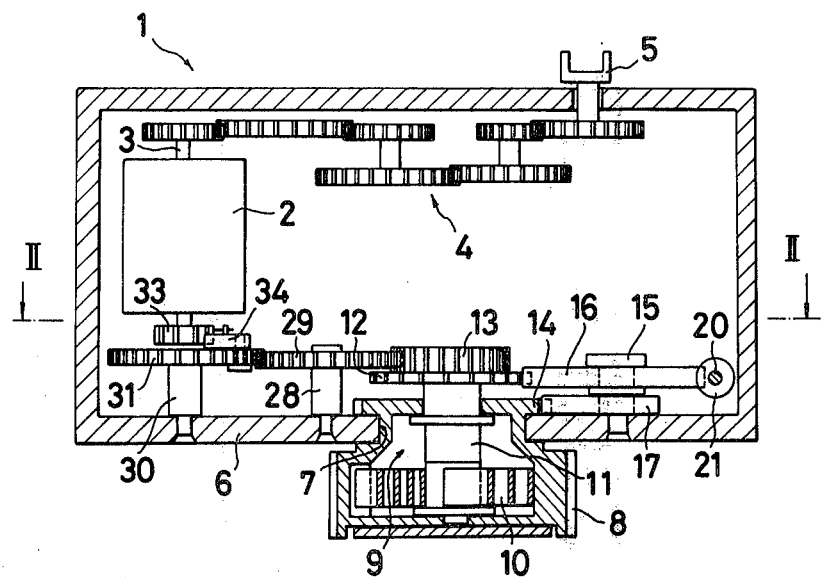
FIG. 1 is a schematic sectional view of an embodiment of an automatic film winding apparatus according to the present invention.
Figure 2:
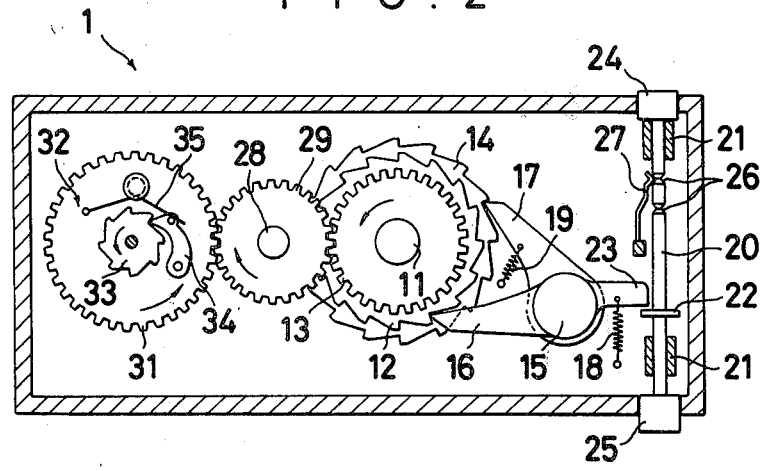
FIG. 2 is a schematic sectional view taken along line II—II.

Referring to FIGS. 1 and 2, in an automatic film winding apparatus 1 which is detachable from a body of a camera (not shown), there is disposed a motor 2 which is driven by a battery (not shown). An output shaft 3 of the motor 2 is connected to a connecting member 5 through a transmission gear train 4. The connecting member 5 is connected to a film winding driving shaft of the body of the camera. The connecting member 5 can also be designed so as to set a shutter together with the film winding operation. Between the output shaft 3 and the transmission gear train 4, there are disposed a mechanism for preventing excessive power supply for film winding and a braking and stopping mechanism, which are not shown in the figures since they are well-known. An opening 7 is formed in a wall 6 of the automatic film winding apparatus 1. The opposite side to the wall 6 of the automatic film winding apparatus 1 is attached to the body of the camera. In the opening 7, there is disposed rotatably a cylindrical winding knob 8, which protrudes from the automatic film winding apparatus 1. In a hollow portion 9 of the knob 8, there is provided a spiral spring 10 whose outer end is fixed to an inner wall of the knob 8 and whose inner end is fixed to a spool 11.

The spool 11 extends into the automatic film winding apparatus 1 and on the extended end of the spool 11, there are fitted a ratchet wheel 12 and a gear 13. A ratchet wheel 14 is formed integrally with the cylindrical knob 8 and is slidingly in contact with the inner wall of the automatic film winding apparatus 1.

On a shaft 15 disposed in the apparatus 1, two levers 16, 17 are swingably mounted. The lever 16 is in a position engageable with the ratchet wheel 12, and the lever 17 in a position engageable with the ratchet wheel 14. The levers 16, 17 are biased by springs 18, 19, respectively, so as to engage the ratchet wheel 12 and the ratchet wheel 14, respectively.

On the side of a base portion 23 of the lever 16, a switching shaft 20 is disposed slidably on a pair of bearings 21. A flange 22 formed on the switching shaft 20 is brought into contact with the base portion 23 of the lever 16 by the movement of the switching shaft 20 so that the lever 16 is turned counterclockwise against the resilience of the coil spring 18, whereby the lever 16 is disengaged from the ratchet 12. The switching shaft 20 is designed to be a little longer than the width of the apparatus 1 and one end of the switching shaft 20 protrudes to the outside of the apparatus 1. Therefore, by pushing one projected end portion 24 or 25 of the switching shaft 20, the position of the lever 16 can be regulated so that the lever 16 is engaged with or disengaged from the ratchet wheel 12. On the shaft 20, there are formed a pair of small diameter portions 26, in one of which a plate-spring-shaped regulating member 27 is fitted, whereby the switching shaft 20 is stopped at a predetermined position.

An intermediate gear 29 mounted on a support shaft 28 is engaged with the gear 13 and is also engaged with a gear 31 which is mounted on a support shaft 30 coaxially with the output shaft 3 of the motor 2. Furthermore, a ratchet wheel 33 is fitted on the output shaft 3 in proximity to a side surface 32 of the gear 31, and a pawl 34 which is pivotally mounted on the side surface 32 of the gear 31 is engageable with the ratchet wheel 33. The pawl 34 is always urged by a spring means 35 so as to engage the ratchet wheel 33.

The automatic film winding apparatus 1 is operated as follows. First, one end portion 24 of the switching shaft 20 is pushed manually so as to take a position as shown in FIG. 2. At this moment, the flange 22 of the shaft 20 is kept apart from the base portion 23 of the lever 16. Therefore, the lever 16 is biased clockwise by the coil spring 18 and is engaged with the ratchet wheel 12 so that the rotation of the ratchet wheel 12 as a pawl by the sprial spring 10 is stopped. When the film winding knob 8 is rotated under this condition, the spiral spring 10 is wound and energy is stored in the spring 10. At this moment, since the lever 17, which is also a pawl is brought into pressure contact with the ratchet wheel 14 by the coil spring 19 so that the clockwise rotation of the ratchet wheel 14 is prevented, the spiral spring 10 is not released.

The automatic film winding apparatus 1 is then mounted on a body of a camera (not shown) so that, when a release button (not shown) is pressed, the actuation of a shutter and the winding of a film and the shutter driving mechanism are performed alternatively to make a continuous series of photographs. Rotation of the output shaft 3 of the motor 2 causes the ratchet wheel 33, which is integral with the output shaft 3 also to be rotated. However, the ratchet wheel 33 is connected to the gear 31 through the pawl 34 which is urged by the spring 35 so as to be engaged with the ratchet wheel 33 and, when the ratchet wheel 33 is rotated counterclockwise in FIG. 2, the pawl 34 slides along the sloping sides of the teeth of the ratchet wheel 33. Therefore, the spiral spring 10 is not effected at all by the rotation of the output shaft 3.

When the winding of a film and a shutter blind by the motor 2 is continued in this manner, a battery (not shown) that supplies power to the motor 2 will run down and the available power will become insufficient. When the available power drops below a certain level, the winding of the film and of the shutter driving mechanism will be stopped. In this case, the other end portion 25 of the switching shaft 20 must be pushed manually so that the switching shaft 20 is moved upwards from the position of the switching shaft 20 shown in FIG. 2 to cause the flange 22 of the shaft 20 to be brought into pressure contact with the base portion 23 of the lever 16 and the lever 16 to be swung counterclockwise against the resilience of the spring 18 so that the lever 16 is released from the ratchet wheel 12. The ratchet wheel 12 can then rotate in the direction of the arrow in response to force from the spiral spring 10. The rotation of the ratchet wheel 12 is transmitted to the output shaft 3 of the motor 2 through the intermediate gear 29, the gear 31, the pawl 34, and the ratchet wheel 33, so that the winding of the film and the shutter mechanism is performed by the spiral spring 10. As mentioned previously, between the output shaft 3 and the transmission gear train 4, known means are provided for preventing excessive power supply for film winding and for braking and stopping. Therefore, the winding of the film and the shutter mechanism by the spiral spring 10 is made during a predetermined film winding operation.

In the above-mentioned embodiment, the automatic film winding apparatus 1 is explained separately from the body of the camera, but it can be built in the camera.

What is claimed is:

1. An automatic film winding apparatus for use with cameras, said apparatus comprising:
   main driving means comprising an electric motor and an output shaft therefor;
   sub-driving means comprising a spring motor;
   a connecting member which is to be connected to a film winding mechanism of a camera and which is connected to said output shaft;
   connecting means for connecting said sub-driving means to said main driving means, said connecting means comprising a one-way rotation transmission mechanism which allows transmission of rotation only from said sub-driving means to said output shaft; and
   switching means for selectively actuating said connecting means to transmit power from said sub-driving means to said output shaft to drive said connecting member.

2. An automatic film winding apparatus for use with cameras as claimed in claim 1, wherein said sub-driving means comprises a rotary member and said one-way rotation transmission mechanism comprises a ratchet wheel mounted on said output shaft and a pawl mounted on said rotary member in position to engage said ratchet wheel to transmit rotary motion from said rotary member to said ratchet wheel only in one direction of rotation.

3. An automatic film winding apparatus for use with cameras as claimed in claim 2, in which said ratchet wheel and said rotary member are axially aligned with each other, and said one-way rotation transmission mechanism comprises means resiliently urging said pawl into engagement with said ratchet wheel.

4. An automatic film winding apparatus for use with cameras comprising:
   a main driving apparatus comprising an electric motor;
   a sub-driving apparatus comprising a spring motor;
   a connecting member which is to be connected to a film winding mechanism on the camera and which is driven by at least one apparatus out of said main driving apparatus and said sub-driving apparatus;
   connecting means for connecting said main driving apparatus to said sub-driving apparatus, said connecting means including a one-way rotation transmission mechanism which allows transmission of rotation only from said sub-driving apparatus to an outout shaft of said main driving apparatus; and
   switching means for selectively transmitting a driving force of one apparatus out of said main driving apparatus and said sub-driving apparatus to said connecting member, said switching means comprising a prohibiting means for prohibiting transmission of a driving force from said sub-driving apparatus to said main driving apparatus, and a releasing means for releasing said prohibiting means, said prohibiting means comprising a ratchet wheel mounted on an output shaft of said sub-driving apparatus and a pawl engageable with said ratchet wheel, and said releasing means comprises an operation member capable of detaching said pawl from said ratchet wheel by operating said operation member from outside of said automatic film winding apparatus.

5. An automatic film winding apparatus for use with cameras as claimed in claim 4, comprising biasing means to bias said pawl with said ratchet wheel and, when said operating member is in the second position, said pawl is disengaged from said ratchet wheel against the bias.

6. An automatic film winding apparatus for use with cameras as claimed in claim 4, comprising detent means engaging cooperating means on said operation member, whereby said operation member can be stopped in a click stop manner at the first position and at the second position.

7. An automatic film winding apparatus for use with cameras as claimed in claim 4, wherein said operation member can be moved so as to take a first position and a second position, and said member allows said pawl to be engaged with said ratchet wheel in the first position and disengages said pawl from said ratchet wheel in the second position.

8. An automatic film winding apparatus for use with cameras as claimed in claim 4, wherein said operation member is supported so as to be movable forwards and backwards, viewed from a position where said automatic film winding apparatus is attached to a camera, and the front and back ends of said operation member are selectively projected from said automatic film winding apparatus.

* * * * *